United States Patent [19]

Hoitz et al.

[11] Patent Number: 5,931,276
[45] Date of Patent: Aug. 3, 1999

[54] ADJUSTABLE CHUTE FOR X-RAY SHEET FILM

[75] Inventors: Gerd Hoitz, Bad Ditzenbach; Albert Rieger, Unterboehringen; Friedrich Ueffinger, Stuttgart, all of Germany

[73] Assignee: Eastman Kodak Company, Rochester, N.Y.

[21] Appl. No.: 08/947,686

[22] Filed: Oct. 9, 1997

[30] Foreign Application Priority Data

Nov. 29, 1996 [DE] Germany ............................ 196 49 531

[51] Int. Cl.⁶ .......................... B65G 11/00; B65G 11/10
[52] U.S. Cl. ..................... 193/2 C; 193/25 FT; 193/25 E
[58] Field of Search ................. 193/2 C, 25 FT, 193/25 E

[56] References Cited

U.S. PATENT DOCUMENTS

| | | | |
|---|---|---|---|
| 4,049,142 | 9/1977 | Azzaroni | 271/5 |
| 4,539,794 | 9/1985 | Azzaroni | 193/2 C |
| 5,255,304 | 10/1993 | Üffinger et al. | |
| 5,333,850 | 8/1994 | Kushima et al. | 271/164 |
| 5,400,099 | 3/1995 | Neitzel et al. | 354/310 |
| 5,402,997 | 4/1995 | Schölpple et al. | |
| 5,782,065 | 7/1998 | Gaebele | 53/504 |

FOREIGN PATENT DOCUMENTS

| | | | |
|---|---|---|---|
| 3705851 | of 0000 | Germany. | |
| 0185612 | 8/1987 | Japan | 193/25 |

*Primary Examiner*—William E. Terrell
*Assistant Examiner*—Wonki Park
*Attorney, Agent, or Firm*—William F. Noval

[57] ABSTRACT

An adjustable chute for X-ray sheet film having different film formats. The chute is further developed in such a way that sheet film received from a cassette loading and unloading station of a daylight cassette loading and unloading device is to be centrically introduced into, and deposited in a light-tight collecting magazine. For this purpose, the chute comprises two guide holders which are arranged in one plane for guiding sheet film from the loading and unloading device into the magazine. The guide holders are pivotable about oppositely and fixedly spaced pivot points for providing an input opening for the sheet film. Setting device arranged adjacent to an output opening of the chute centrically adjusts the guide holders to the film format of the sheet film supplied to the magazine.

7 Claims, 2 Drawing Sheets

ADJUSTABLE CHUTE FOR X-RAY SHEET FILM

FIELD OF THE INVENTION

The invention relates to an adjustable chute for x-ray sheet film, which serves for centrically entering and depositing said sheet film in a light-tight collecting magazine and provides the film having different formats transport path between said collecting magazine arranged in and a cassette loading and unloading station of a daylight cassette loading and unloading device.

BACKGROUND OF THE INVENTION

An adjustable x-ray film feeding device in a means for automatically loading and unloading x-ray film cassettes is known from DE-32 20 606 C2 or U.S. Pat. No. 4,539,794. The feeding device for an x-ray sheet film which is selected by means of a cassette unloading and loading device, respectively, from a number of supply magazines loaded with unexposed x-ray films and is fed into an x-ray film cassette corresponding to the film format chosen comprises an adjustable hoffer for the films removed from the supply magazines. The hoffer has two U-shaped guide elements one of the elements is fixed, while the other is supported for sliding by a frame of the device so that it moves towards and away from the fixed guide element. The movable element is connected to a pusher device which positions the X-ray cassette inserted in the unloading station up against an abutment member.

This type of design of the hoffer elements does not prevent the film from being tilted or jammed as a result of its lateral abutment effective along the whole length of the film. Moreover the film cannot be centrically entered into a cassette because of the stationary arrangement of the first guide element.

It is desirable, however, that a great number of exposed films removed from the cassettes by means of the cassette loading and unloading device be stored in a single depositing magazine so that the films can be further processed by means of a separate device at a later date. It is moreover desirable that the films can be unloaded from the cassettes independently of their formats and thus in a random order. This, however, requires a centrical alignment of the films in the depositing magazine.

SUMMARY OF THE INVENTION

It is the object of the invention to further develop an adjustable chute for x-ray sheet films such that exposed x-ray film sheets of different formats can be safely and centrically entered into, and deposited in a single collecting magazine, such chute being easily and readily adjustable to various film formats.

According to the invention this object is attained by adjustable chute comprising two guide holders which are arranged in one plane for guiding the X-ray sheet film from a daylight cassette loading and unloading device into a collecting magazine. The guide holders are pivotable about oppositely positioned pivot points spaced at a fixed distance to each other for providing an input opening for the X-ray sheet film. With the aid of setting means arranged adjacent an output opening of the chute, the guide holders can be adjusted to the film format of the sheet film supplied to the collecting magazine. In the result, a point-wise film guidance is advantageously attained which prevents the film from being tilted or jammed in the feeding device.

The pivot points are formed by pins which are arranged on a holding rail connected with the housing of the cassette loading and unloading device and which are received in bores arranged in the guide holders. At the output opening of the chute, guide plates connect the guide holders with elements movable to and fro on a shaft, the path of movement of said elements being limited by an inner abutment element fixedly connected with said shaft and by outer abutment elements. The elements themselves are connected with the piston rod as well as the housing of a bi-directional pneumatic cylinder, which allows a speedy and uncomplicated adjustment of the width to the film format fed to the collecting magazine.

The collecting magazine and the film ejection sides of the guide holders are centrically aligned with each other whereby the films fed into the collecting magazine are also centrically deposited in the magazine.

Further details and advantages of the invention can be inferred from the subclaims in connection with the description of an embodiment that will now be explained with reference to the drawing.

DETAILED DESCRIPTION OF THE INVENTION

Figure 1:
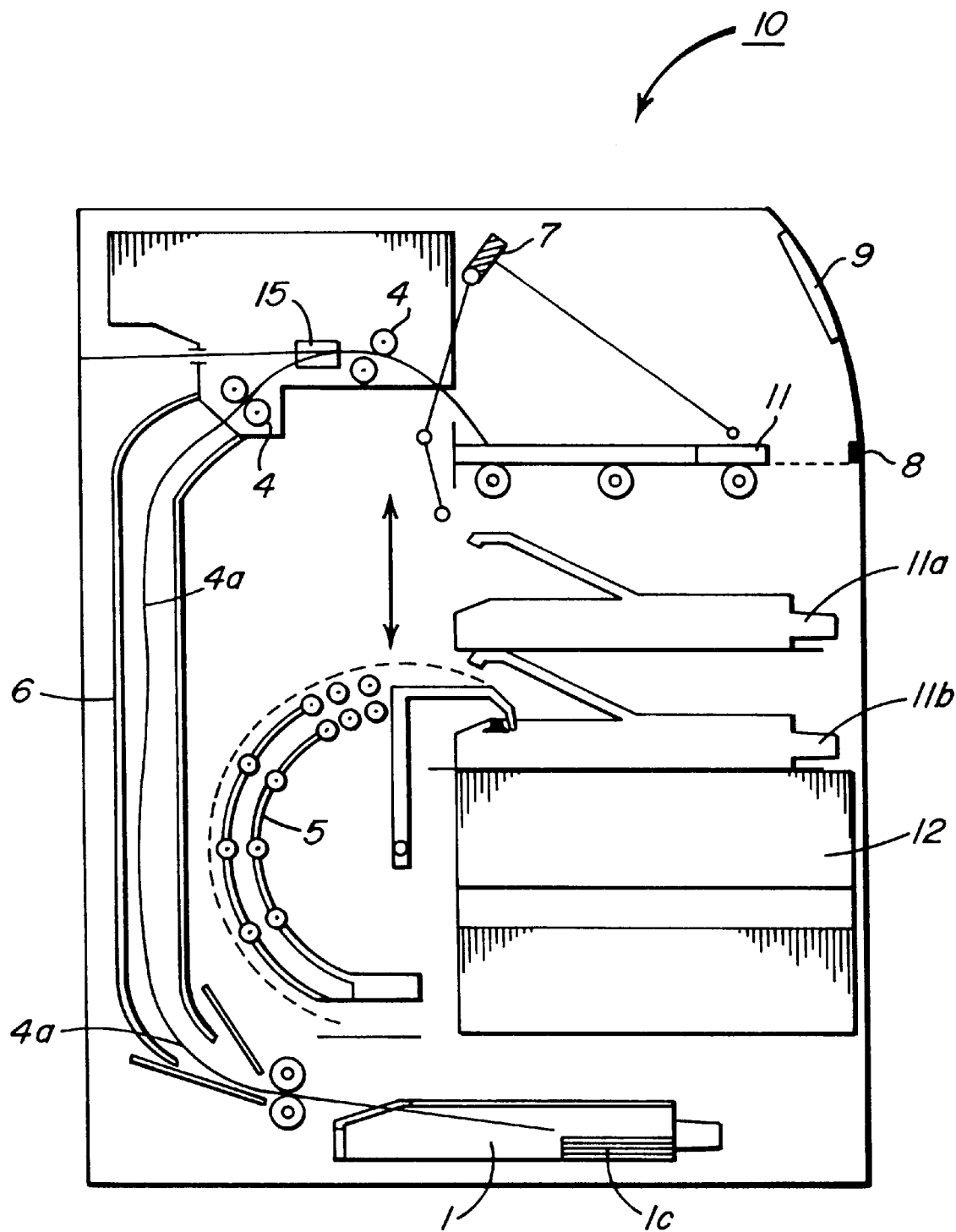
FIG. 1 shows a schematical cross-sectional view of a daylight cassette loading and unloading device.

A loading and unloading device 10 for x-ray film cassettes comprises at its front a cassette entrance opening 8 which is closable in a light-tight manner and into which an x-ray film cassette 11 can be introduced. A station 7 (see DE 40 37 378-A1 and DE 37 05 851-A1) serves for opening and closing cassette 11 as well as for detecting the film format of the film loaded in cassette 11. A number of film supply magazines which are denoted 11a and 11b and may also consist of a greater number than illustrated contain unexposed x-ray films each of a specific format. A loading and unloading station 5 is movable horizontally and vertically according to the arrows shown in the drawing to allow the exposed film to be removed from cassette 11 and subsequently to be transferred to one of the pairs of film transport rollers 4 as well as an unexposed film to be removed from one of the supply magazines 11a and 11b. The film is selected according to the film format detected by station 7. The individual elements of the loading and unloading station including their functioning are explained in more detail in the aforementioned specifications, e.g. the cassette transport (DE 40 13 285), the alignment of the cassettes (DE 40 13 285-A1), the opening and closing of the cassettes (DE 40 37 378-A1), the film sheet removal device (DE 37 16 904-C2), the film loading device (DE 37 05 85 1-C1) so that they need not be described in detail. Moreover, the detection of the number of films as well as the film height of the exposed x-ray films introduced into a collecting magazine are described in DE patent application 195 25 085.4.

According to the previously detected film format the loading and unloading station 5 removes a film of a corresponding format from one of the film supply magazines 11a or 11b and introduces it into cassette 11 which subsequently can be removed from the loading and unloading device 10 through opening 8.

Within the film transport path 4a, a deflecting element 15 is provided by which the films removed from cassette 11 can be fed to a processing station (not illustrated).

Figure 2:
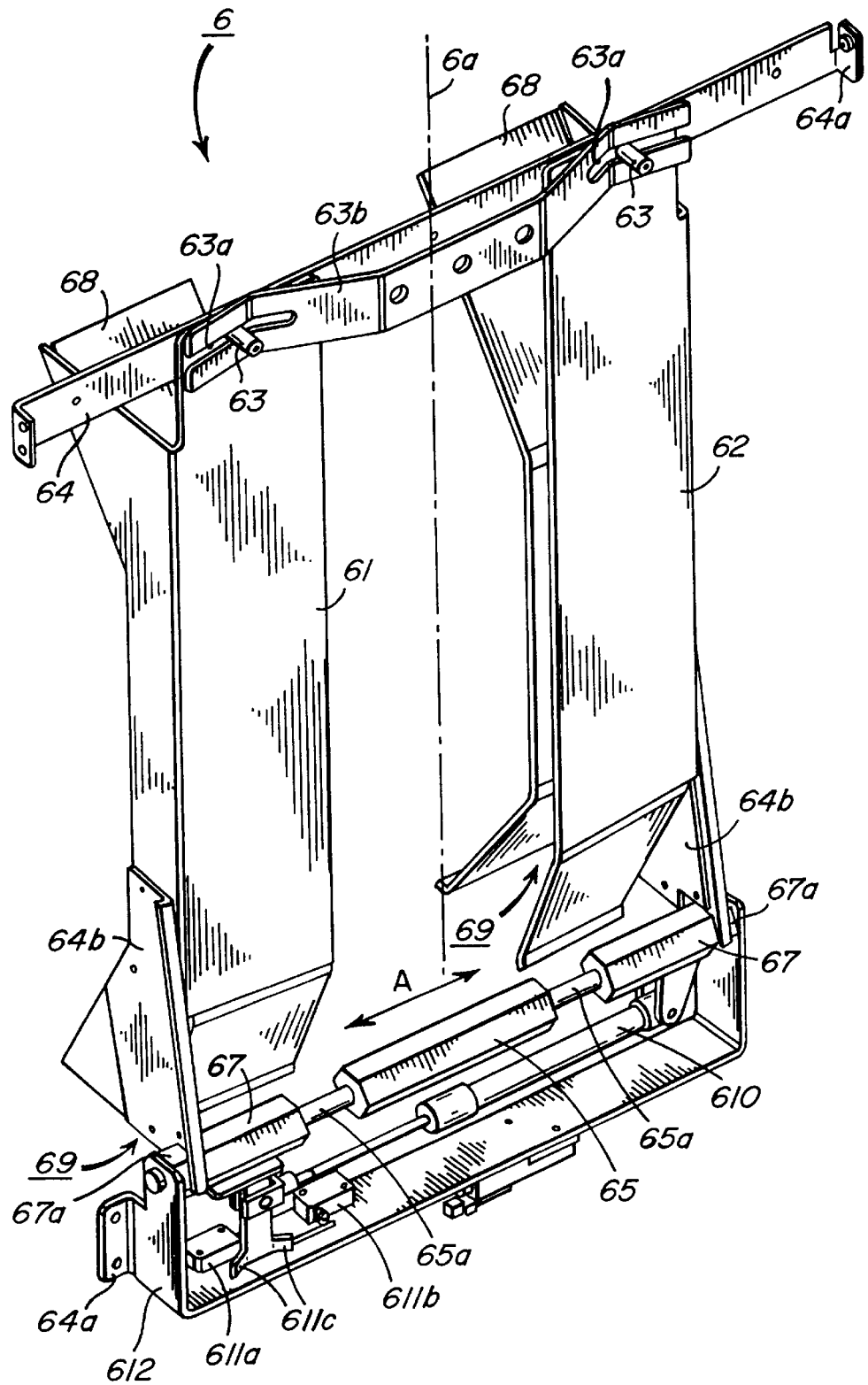
FIG. 2 a perspective view of the chute according to the invention.

A collecting magazine 1 is provided for receiving the films from the cassette fed through entrance opening 8, the films 1c being introduced into said magazine in a random way, i.e. corresponding to the order in which they are unloaded from the cassettes containing the preferred film formats of 18×24 cm and 24×30 cm. For this purpose the films are transported by means of the pairs of transport rollers 4 through an adjustable chute 6. As depicted in FIGS. 1 and 2, the chute 6, arranged in the housing of the loading and unloading device 10, includes an input opening 68 for receiving sheet film from the cassette loading and unloading station 5 and includes an output opening 69 for centrically entering and depositing the sheet film into the collecting magazine 1.

Chute 6 consists of two guide holders 61 and 62 arranged in one plane and pivotable at the input opening 68 about pins 63. The pins 63 which are spaced on a holding rail 64 at a fixed distance from each other which corresponds to the maximum film format are received in bores 63a of the guide holders 61 and 62 and are prevented from being withdrawn by a spring element 63b. The holding rail has bent-off ends 64a which are connected to the housing of the cassette loading and unloading device.

Collecting magazine 1 (not illustrated) is arranged at the output opening 69 of the guide holders 61 and 62 in centrical alignment with the central axis 6a of chute 6. At the output opening, the guide holders feature guide plates 64b which are connected each with elements 67 movable to and fro in the direction of the arrow A on a shaft 65a. An inner abutment element 65 serving to limit the path of movement of the elements 67 is moreover stationarily arranged in the middle of shaft 65a. One element 67 each is mounted to the piston rod of a bi-directional pneumatic cylinder 610 and the other one to the other end thereof, end switches 611a and 611b being actuated by means of actuating elements 611c such that the chute control is informed about the chute position. The shaft is mounted in a frame portion 612 whose bent-off ends 64a are connected with the cassette loading and unloading device 10.

The film entrance and ejection sides of the guide elements 61 and 62 are funnel-shaped, with the vertical parts of the guide elements having rectangular cross-sections and the cross-sectional height corresponding to several times the thickness of the films.

Via a light-sealable opening (not illustrated), the collecting magazine 1 can be shifted into, and removed from, respectively, the front side of the loading and unloading device 10, lid 1b of collecting magazine 1 being opened when the magazine is shifted in and closed in a light-tight manner when the magazine is withdrawn, by means of a device (not illustrated either).

In addition, an electronic unit 12 connects by lines not illustrated the individual stations such as the cassette entrance opening, station 7, loading and unloading station 5, the rollers of the pairs of film transport rollers 4 which are each driven by a motor (not illustrated) and the end switches 611a and 611b by which the bi-directional pneumatic cylinder 610 of chute 6 is switched on and off.

Upon arrangement of a collecting magazine 1 in the loading and unloading device 10 the chute according to the invention functions as follows:

After a film cassette 11 has been introduced through cassette entrance opening 8, said opening is closed in a light-tight manner. Station 7 detects the film format of the film contained in the cassette whereupon the cassette lid is opened and, by means of loading and unloading station 5, the exposed film removed from cassette 11 and fed to the pair of film transport rollers 4 arranged adjacent to station 7. Depending on the configuration of the device, deflecting element 15 has been activated. As indicated on the operating and display panel 9, film transport thus either occurs along the film transport path 4a into the processing machine or through chute 6 into collecting magazine 1.

If the film is fed to collecting magazine 1 it is transported with the aid of the pairs of transport rollers 4 through adjustable chute 6 into magazine 1. Depending on the film format detected by station 7 the electronic unit 12 ascertains whether or not the final position of the chute (width set) and thus the end switch 611a or 611b actuated at that moment corresponds to the film format supplied. If there is a deviation the electronic unit actuates the pneumatic cylinder which moves up to abutment 612 and 65, respectively, the corresponding end switch informing the electronic unit about the completion of the movement of the pneumatic cylinder. The film ejection side 69 of the chute has thus been adjusted to the corresponding film width of the film fed to the collecting magazine and the film is entered into the magazine in a centrically aligned fashion.

Within the scope of this invention the device can also be operated in the absence of a deflecting element 15 and a processing machine.

The invention has been described in detail with particular reference to certain preferred embodiments thereof, but it will be understood that variations and modifications can be effected within the spirit and scope of the invention.

| PARTS LIST | |
|---|---|
| 1 | light-tight collecting magazine |
| 1c | films |
| 4 | film transport rollers |
| 4a | film transport path |
| 5 | loading and unloading station |
| 6 | adjustable chute |
| 6a | central axis |
| 7 | cassette loading and unloading station |
| 8 | entrance opening |
| 9 | display panel |
| 10 | daylight loading and unloading device |
| 11 | cassette |
| 11a,11b | film supply magazines |
| 12 | electronic unit |
| 15 | deflecting element |
| 61,62 | guide holders |
| 63 | pins |
| 63a | bores |
| 63b | spring element |
| 64 | holding rail |
| 64a | fastening element |
| 64b | guide plates |
| 65 | inner abutment element |
| 65a | shaft |
| 67 | elements |
| 67a | outer abutment elements |
| 68 | input opening |
| 69 | output opening |
| 610 | bi-direction pneumatic cylinder |
| 611a,611b | end switches |
| 611c | actuating elements |
| 612 | frame portion |

What is claimed is:

1. In a loading and unloading device for X-ray sheet film having a housing, a cassette loading and unloading device including a cassette loading and unloading station, and a light-tight collecting magazine, the improvement comprising:

an adjustable chute for transporting said sheet film, said chute having an input opening for receiving said sheet film from said cassette loading and unloading device for receiving said sheet film from said cassette loading and unloading station, an output opening for centrically entering and depositing said sheet film into said light-tight collecting magazine, two guide holders arranged in one plane for guiding said sheet film from said loading and unloading device into said magazine, oppositely and fixedly spaced pivot points attached to said housing, said guide holders being pivotable about said oppositely and fixedly spaced pivot points for providing said input opening for said sheet film, and setting means arranged adjacent to said output opening for centrically adjusting said guide holders according to the particular film format of said sheet film that is supplied to said magazine.

2. Chute according to claim 1, characterized in that on their output opening said guide holders are connected by guide plates to elements movable to and fro on a shaft, the path of movement (A) of said elements being limited by an inner abutment element stationarily mounted on said shaft, and outer abutment elements, and in that said inner and outer elements are connected with the piston rods of a bi-directional pneumatic cylinder.

3. Chute according to claim 1, characterized in that said shaft is held by a frame portion and in that said frame portion can be connected, via a fastening element, with said housing of said cassette loading and unloading device.

4. Chute according to claim 1, characterized in that said pivot points are formed by pins which are arranged on a holding rail connected with said housing of the cassette loading and unloading device and pass through bores provided in said guide holders.

5. Chute according to claim 4, characterized in that the distance of said pins from each other is chosen such that said chute allows an X-ray sheet film to be introduced whose format corresponds to the maximum film format of 24*30 cm.

6. Chute according to claim 1, characterized in that said collecting magazine and said input and output openings of said chute are centrically aligned with respect to their central axis.

7. Chute according to claim 1, characterized in that said input opening and output opening of said guide holders are funnel-shaped.

* * * * *